(12) United States Patent
Bonkowski et al.

(10) Patent No.: US 7,754,112 B2
(45) Date of Patent: Jul. 13, 2010

(54) METHODS FOR FORMING SECURITY ARTICLES HAVING DIFFRACTIVE SURFACES AND COLOR SHIFTING BACKGROUNDS

(75) Inventors: Richard L. Bonkowski, Santa Rosa, CA (US); Patrick K. Higgins, Windsor, CA (US); Charles T. Markantes, Santa Rosa, CA (US); Roger W. Phillips, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 10/706,142

(22) Filed: Nov. 12, 2003

(65) Prior Publication Data

US 2004/0094850 A1   May 20, 2004

Related U.S. Application Data

(62) Division of application No. 09/351,102, filed on Jul. 8, 1999, now Pat. No. 6,761,959.

(51) Int. Cl.
*B29D 11/00* (2006.01)
(52) U.S. Cl. .................. 264/1.34; 264/1.7; 264/1.9; 264/2.7; 264/173.18; 427/164
(58) Field of Classification Search .................. 264/1.1, 264/1.7, 1.31, 2.7, 1.34, 173.16, 1.9, 173.18; 428/29; 427/162, 164
See application file for complete search history.

(56) References Cited

U.S. PATENT DOCUMENTS

| | | |
|---|---|---|
| 3,011,383 A | 12/1961 | Sylvester et al. |
| 3,338,730 A | 8/1967 | Slade et al. ............... 428/142 |
| 3,676,273 A | 7/1972 | Graves ................... 428/328 |
| 3,853,676 A | 12/1974 | Graves ................... 161/5 |
| 4,066,280 A | 1/1978 | LaCapria |

(Continued)

FOREIGN PATENT DOCUMENTS

AU   488652   11/1977

(Continued)

OTHER PUBLICATIONS

John M. McKiernan, et al., "Luminescence and Laser Action of Coumarin Dyes Doped in Silicate and Aluminosilicate Glasses Prepared by the Sol-Gel Technique," Journal of Inorganic and Organometallic Polymers, vol. 1, No. 1, 1991, pp. 87-103.

(Continued)

*Primary Examiner*—Mathieu D. Vargot
(74) *Attorney, Agent, or Firm*—Matthew A. Pequignot; Pequignot + Myers LLC

(57) ABSTRACT

A security article includes a light transmissive substrate having a first surface and an opposing second surface, with the first surface having an embossed region with an optical diffraction pattern or a holographic image pattern. A color shifting optical coating is formed on the substrate such as on the opposing second surface, with the optical coating providing an observable color shift as the angle of incident light or viewing angle changes. The security article can be used in a variety of applications and products to provide for enhanced security measures such as anticounterfeiting.

6 Claims, 3 Drawing Sheets

U.S. PATENT DOCUMENTS

| | | | |
|---|---|---|---|
| 4,099,838 A | 7/1978 | Cook et al. | 359/537 |
| 4,126,373 A | 11/1978 | Moraw | |
| 4,155,627 A | 5/1979 | Gale et al. | |
| 4,168,983 A | 9/1979 | Vittands et al. | |
| 4,244,998 A | 1/1981 | Smith | |
| 4,310,584 A | 1/1982 | Cooper et al. | 428/212 |
| 4,434,010 A | 2/1984 | Ash | |
| 4,705,300 A | 11/1987 | Berning et al. | |
| 4,705,356 A | 11/1987 | Berning et al. | |
| 4,721,217 A | 1/1988 | Phillips et al. | |
| 4,756,771 A | 7/1988 | Brodalla et al. | |
| 4,779,898 A | 10/1988 | Berning et al. | |
| 4,838,648 A | 6/1989 | Phillips et al. | |
| 4,867,793 A | 9/1989 | Franz et al. | 106/415 |
| 4,930,866 A | 6/1990 | Berning et al. | |
| 5,002,312 A | 3/1991 | Phillips et al. | |
| 5,009,486 A | 4/1991 | Dobrowolski et al. | |
| 5,059,245 A | 10/1991 | Phillips et al. | |
| 5,084,351 A | 1/1992 | Phillips et al. | |
| 5,106,125 A | 4/1992 | Antes | |
| 5,135,812 A | 8/1992 | Phillips et al. | |
| 5,171,363 A | 12/1992 | Phillips et al. | |
| 5,186,787 A | 2/1993 | Phillips et al. | 216/36 |
| 5,214,530 A | 5/1993 | Coombs et al. | |
| 5,223,360 A | 6/1993 | Prengel et al. | 430/39 |
| 5,254,390 A | 10/1993 | Lu | |
| 5,278,590 A | 1/1994 | Phillips et al. | |
| 5,279,657 A | 1/1994 | Phillips et al. | |
| 5,339,737 A | 8/1994 | Lewis et al. | |
| 5,364,467 A | 11/1994 | Schmid et al. | |
| 5,437,931 A | 8/1995 | Tsai et al. | 428/446 |
| 5,447,335 A | 9/1995 | Haslop | 283/91 |
| 5,464,710 A | 11/1995 | Yang | |
| 5,549,774 A | 8/1996 | Miekka et al. | |
| 5,549,953 A | 8/1996 | Li | |
| 5,571,624 A | 11/1996 | Phillips et al. | |
| 5,591,527 A | 1/1997 | Lu | |
| 5,624,076 A | 4/1997 | Miekka et al. | |
| RE35,512 E | 5/1997 | Nowak et al. | |
| 5,629,068 A | 5/1997 | Miekka et al. | |
| 5,630,877 A | 5/1997 | Kashiwagi et al. | 118/623 |
| 5,648,165 A | 7/1997 | Phillips et al. | |
| 5,650,248 A | 7/1997 | Miekka et al. | |
| 5,672,410 A | 9/1997 | Miekka et al. | |
| 5,700,550 A | 12/1997 | Uyama et al. | |
| 5,763,086 A | 6/1998 | Schmid et al. | |
| 5,856,048 A | 1/1999 | Tahara et al. | |
| 5,858,078 A | 1/1999 | Andes et al. | |
| 5,907,436 A | 5/1999 | Perry et al. | 359/576 |
| 5,912,767 A | 6/1999 | Lee | |
| 5,989,626 A | 11/1999 | Coombs et al. | |
| 6,013,370 A | 1/2000 | Coulter et al. | |
| 6,031,457 A | 2/2000 | Bonkowski et al. | |
| 6,045,230 A | 4/2000 | Dreyer et al. | |
| 6,068,691 A | 5/2000 | Miekka et al. | |
| 6,112,388 A | 9/2000 | Kimoto et al. | |
| 6,150,022 A | 11/2000 | Coulter et al. | |
| 6,157,489 A | 12/2000 | Bradley, Jr. et al. | |
| 6,168,100 B1 | 1/2001 | Kato et al. | |
| 6,241,858 B1 | 6/2001 | Phillips et al. | |
| 6,242,510 B1 | 6/2001 | Killey | |
| 6,243,204 B1 | 6/2001 | Bradley, Jr. et al. | |
| 6,586,098 B1 | 7/2003 | Coulter et al. | 428/403 |
| 6,686,027 B1 | 2/2004 | Caporaletti et al. | 428/195.1 |
| 6,692,830 B2 | 2/2004 | Argoitia et al. | 428/403 |
| 6,749,777 B2 | 6/2004 | Argoitia et al. | 252/582 |
| 6,751,022 B2 | 6/2004 | Phillips | 359/577 |
| 6,761,959 B1 | 7/2004 | Bonkowski et al. | 428/156 |
| 6,818,299 B2 | 11/2004 | Phillips et al. | 428/403 |
| 6,987,590 B2 | 1/2006 | Phillips et al. | 369/2 |
| 7,029,525 B1 | 4/2006 | Mehta | 106/31.6 |
| 2003/0058491 A1 | 3/2003 | Holmes et al. | 359/2 |
| 2003/0190473 A1 | 10/2003 | Argoitia | |
| 2004/0009309 A1 | 1/2004 | Raksha et al. | 427/598 |
| 2004/0051297 A1 | 3/2004 | Raksha | |
| 2004/0081807 A1 | 4/2004 | Bonkowski et al. | 428/195.1 |
| 2004/0105963 A1 | 6/2004 | Bonkowski et al. | 428/195.1 |
| 2005/0106367 A1 | 5/2005 | Raksha | |
| 2005/0128543 A1 | 6/2005 | Phillips et al. | 359/15 |
| 2006/0077496 A1 | 4/2006 | Argoitia | 359/2 |
| 2007/0058227 A1 | 3/2007 | Raksha et al. | 359/2 |

FOREIGN PATENT DOCUMENTS

| | | |
|---|---|---|
| DE | 1696245 | 1/1972 |
| DE | 3932505 | 4/1991 |
| DE | 4212290 | 5/1993 |
| DE | 43 43 387 | 6/1995 |
| DE | 19611383 | 9/1997 |
| DE | 19731968 | 1/1999 |
| DE | 19744953 | 4/1999 |
| DE | 19639165 | 10/2003 |
| EP | 0138194 | 10/1984 |
| EP | 0185396 | 12/1985 |
| EP | 0420261 | 4/1991 |
| EP | 0660262 | 1/1995 |
| EP | 0170439 | 4/1995 |
| EP | 0 756 945 | 2/1997 |
| EP | 0756945 | 2/1997 |
| EP | 0395410 | 8/1997 |
| EP | 0698256 | 10/1997 |
| EP | 0741370 | 5/1998 |
| EP | 0914261 | 5/1999 |
| EP | 1 498 545 A | 1/2005 |
| EP | 1719636 | 11/2006 |
| JP | 11010771 | 1/1999 |
| WO | 93/23251 | 11/1993 |
| WO | 95/17475 | 1/1995 |
| WO | 97/19820 | 6/1997 |
| WO | WO 98/12583 | 3/1998 |
| WO | WO 00/08596 | 2/2000 |
| WO | WO 01/53113 A | 7/2001 |
| WO | 2004/024836 | 3/2004 |

OTHER PUBLICATIONS

Jeffery I. Zink, et al., "Optical Probes and Properties of Aluminosilicate Glasses Prepared by The Sol-Gel Method," Polym. Mater. Sci. Eng., pp. 204-208 (1989).

Don W. Tomkins, Kurz Hastings, "Transparent Overlays for Security Printing and Plastic ID Cards," pp. 1-8, Nov. 1997.

The Mearl Corporation brochure for "Mead Iridescent Film," Peekskill, NY.

J.A. Dobrowolski; K.M. Baird; P.D. Carman; and A. Waldorf, "Optical Interference Coatings for Inhibiting of Counterfeiting," Optica Acta, 1973, vol. 20, No. 12, 925-937.

The R.D. Mathis Company Manual for "Thin Film Evaporation Source Reference," Long Beach, CA.

Minolta Manual for "Precise Color Communication, Color Control From Feeling to Instrumentation," pp. 18, 20, 22, 23, 46, 47, 48 and 49.

Frans Defilet, LGZ Landis & Gyr Zug Corporation, "Kinegrams 'Optical Variable Devices' (OVD's) For Banknotes, Security Documents and Plastic Cards," San Diego, Apr. 1-3, 1987.

S.P. McGrew, "Hologram Counterfeiting: Problems and Solutions," SPIE, vol. 1210 Optical Security and Anticounterfeiting Systems, 1990, pp. 66-76.

Rudolf L. van Renesse, "Security Design of Valuable Documents and Products," SPIE, vol. 2659, Jun. 1996, pp. 10-20.

Steve McGrew, "Countermeasures Against Hologram Counterfeiting," Internet site www.iea.com/nli/publications/countermeasures.htm, Jan. 6, 2000.

Roger W. Phillips, "Optically Variable Films, Pigments, and Inks," SPIE vol. 1323, Optical Thin Films III: New Developments, 1990, pp. 98-109.

Roger W. Phillips, and Anton F. Bleikolm, "Optical Coatings for Document Security," Applied Optics, vol. 35, No. 28, Oct. 1, 1996, pp. 5529-5534.

J.A. Dobrowolski; F.C. Ho; and A. Waldorf; Research on Thin Film Anticounterfeiting Coatings at the National Research Council of Canada, Applied Optics, vol. 28, No. 15, Jul. 15, 1989, pp. 2702-2717.

J. Rolfe, "Optically Variable Devices for Use on Bank Notes, "SPIE, vol. 1210 Optical Security and Anticounterfeiting Systems, pp. 14-19, 1990.

OVD Kinegram Cor, "OVD Kinegram Management of Light to Provide Security," Internet site www.kiknegram.com/xhome/home.html, Dec. 17, 1999.

I.M. Boswarva, et al., "Roll Coater System for the Production of Optically Variable Devices (OVD's) for Security Applications," Proceedings, 33$^{rd}$ Annual Technical Conference, Society of Vacuum Coaters, pp. 103-109 (1990).

U.S. Appl. No. 10/666,318, filed Sep. 18, 2003, Phillips et al.

U.S. Appl. No. 11/047,389, filed Jan. 31, 2005, Phillips et al.

R. Domnick et al, "Influence of Nanosized Metal Clusters on the Generation of Strong Colors and Controlling of their Properties through Physical Vapor Deposition (PVD)" 49$^{th}$ Annual Technical Conference Proceedings (2006), Society of vacuum Coasters.

"Optical Thin-Film Security Devices", J.A. Dobrowolski, Optical Security Document, Rudolf Van Renesse, Artech House, 1998, pp. 289-328.

"Paper Based Document Security—a Review" Rudolf L. van Renesse, European Conference on Security and Detection, Apr. 28-30, 1997, Conference Publication No. 437, p. 75-80.

Diffractive Microstructures for Security Applications: M. T. Gale, Paul Scherrer Institute, Zurich, IEEE Conference Publication London 1991, pp. 205-209, Sep. 16-18, 1991.

"Research on thin film anticounterfeiting coatings at the National Research Council of Canada", J. A. Dobrowolski et al., Applied Optics, vol. 28, No. 14, Jul. 15, 1989, pp. 2702-2717.

Definition of "directly" from Webster's Third New International Dictionary, 1993, p. 641.

METHODS FOR FORMING SECURITY ARTICLES HAVING DIFFRACTIVE SURFACES AND COLOR SHIFTING BACKGROUNDS

CROSS-REFERENCE TO RELATED APPLICATIONS

This application is a divisional of U.S. application Ser. No. 09/351,102 filed on Jul. 8, 1999, now U.S. Pat. No. 6,761,959, entitled "Diffractive Surfaces With Color Shifting Backgrounds," which application is incorporated herein in its entirety, and to which priority is claimed.

BACKGROUND OF THE INVENTION

1. The Field of the Invention

The present invention is related generally to thin film optical coatings for use in producing security articles. More specifically, the present invention is related to the production of diffractive surfaces such as holograms or gratings having color shifting or optically variable backgrounds which can be used as security articles in a variety of applications.

2. The Relevant Technology

Color shifting pigments and colorants have been used in numerous applications, ranging from automobile paints to anti-counterfeiting inks for security documents and currency. Such pigments and colorants exhibit the property of changing color upon variation of the angle of incident light, or as the viewing angle of the observer is shifted. The primary method used to achieve such color shifting colorants is to disperse small flakes, which are typically composed of multiple layers of thin films having particular optical characteristics, throughout a medium such as paint or ink that may then be subsequently applied to the surface of an object.

Diffraction patterns and embossments, and the related field of holographs, have begun to find wide-ranging practical applications due to their aesthetic and utilitarian visual effects. One very desirable decorative effect is the iridescent visual effect created by a diffraction grating. This striking visual effect occurs when ambient light is diffracted into its color components by reflection from the diffraction grating. In general, diffraction gratings are essentially repetitive structures made of lines or grooves in a material to form a peak and trough structure. Desired optical effects within the visible spectrum occur when diffraction gratings have regularly spaced grooves in the range of hundreds to thousands of lines per millimeter on a reflective surface.

Diffraction grating technology has been employed in the formation of two-dimensional holographic patterns which create the illusion of a three-dimensional image to an observer. Furthermore, the use of holographic images on various objects to discourage counterfeiting has found widespread application.

There currently exist several applications for surfaces embossed with holographic patterns which range from decorative items, such as gift wrap, to security documents, such as bank notes and credit cards. Two-dimensional holograms typically utilize diffraction patterns which have been formed on a plastic surface. In some cases, a holographic image which has been embossed on such a surface can be visible without further processing; however, it is generally necessary, in order to achieve maximum optical effects, to place a reflective layer, typically a thin metal layer such as aluminum, onto the embossed surface. The reflective layer substantially increases the visibility of the diffraction pattern embossment.

Unfortunately, there exists a substantial incentive for counterfeiters to reproduce the holograms which are frequently used in credit cards, bank notes, and the like. One of the methods used to reproduce holograms is to scan a laser beam across the embossed surface and optically record the reflected beam on a layer of a material such as a photopolymerizable polymer. The original pattern can subsequently be reproduced as a counterfeit. Another method is to remove the protective covering material from the embossed metal surface by ion etching, and then when the embossed metal surface is exposed, a layer of metal such as silver (or any other easily releasable layer) can be deposited. This is followed by deposition of a layer of nickel, which is subsequently released to form a counterfeiting embossing shim.

Due to the level of sophistication of counterfeiting methods, it has become necessary to develop more advanced security measures. One approach, as disclosed in U.S. Pat. Nos. 5,629,068 and 5,549,774 to Miekka et al., is the application of inks, such as metallic flake inks, metallic effect inks, or inks with pigments formed of optical stacks, upon the embossed surface in lieu of a thin metal layer. In another approach, disclosed in U.S. Pat. Nos. 5,624,076 and 5,672,410 also to Miekka et al., embossed metal particles or optical stack flakes are used to produce a holographic image pattern.

Another problem with the holographic images as described above is that they require direct specular illumination in order to be visualized. This means that for best viewing results, the illuminating light must be incident at the same angle as the viewing angle. Therefore, diffuse light sources, such as ordinary room lights or viewing by an overcast sky, when used to illuminate the holographic image, do not reveal much of the visual information contained in the hologram, and what is typically seen is only a silver colored reflection from the embossed surface.

It would therefore be of substantial advantage to develop improved security products to provide enhanced viewing qualities in ordinary room light and which are usable in various security applications to make counterfeiting more difficult.

SUMMARY AND OBJECTS OF THE INVENTION

It is a primary object of the invention to provide a security article have color shifting properties which increases the difficulty of counterfeiting in a variety of applications.

Another object of the invention to provide a security article with a distinctive pattern that is readily observable over a wide range of viewing angles in diffuse lighting conditions.

Another object of the invention is to provide a security article with a holographic pattern that has enhanced visibility and contrast to provide for viewing under diffuse lighting conditions without the need for direct specular light.

Another object of the invention to provide a security article that can be manufactured at low cost compared to prior security products.

To achieve the forgoing objects and in accordance with the invention as embodied and broadly described herein, a security article is provided which includes a light transmissive substrate having a first surface and an opposing second surface, with the first surface having an optical interference pattern such as a diffraction grating pattern or a holographic image pattern. A color shifting optical coating is formed on the substrate, with the optical coating providing an observable color shift as the angle of incident light or viewing angle changes. In one embodiment, the color shifting optical coating is formed on the second surface of the substrate opposite from the optical interference pattern, and includes an absorber layer formed adjacent to the substrate, a dielectric layer formed on the absorber layer, and a reflector layer formed on the dielectric layer. Alternatively, this multilayer optical coating can be formed on the same side of the substrate as the interference pattern.

In another embodiment, the color shifting optical coating is applied to the substrate in the form of a paint or ink which includes a polymeric medium and a plurality of color shifting multilayer optical interference flakes dispersed in the polymeric medium. In other embodiments, the color shifting optical coating is coextruded with a light transmissive embossed substrate to form adjacent layers or is dispersed in the form of interference flakes in the substrate material prior to forming the substrate.

The security article of the invention can be used in a variety of applications to provide for enhanced security measures such as anticounterfeiting. The security article can be utilized in the form of a label, a tag, a ribbon, a security thread, and the like, for application in a variety of objects such as security documents, monetary currency, credit cards, merchandise, etc.

These and other aspects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered as limiting of its scope, the invention will be described and explained with additional specificity and detail through the use of accompanying drawings in which.

DETAILED DESCRIPTION OF THE INVENTION

The present invention is directed to security articles having diffractive surfaces with color shifting backgrounds that produce enhanced visual effects. The configuration of the security articles is such that a combination of either holographic or diffraction grating patterns with color shifting films or layers decreases the possibility of counterfeiting. Furthermore, the article of the invention allows a user to more easily view the image or diffraction effect in diffuse light without the need for direct specular light.

Generally, the configuration of the security articles of the present invention is such that the combination of a light transmissive substrate, having an interference pattern on the surface thereof, with color shifting optical coatings provides security features that make forgery or counterfeiting of an object difficult.

Figure 1A:
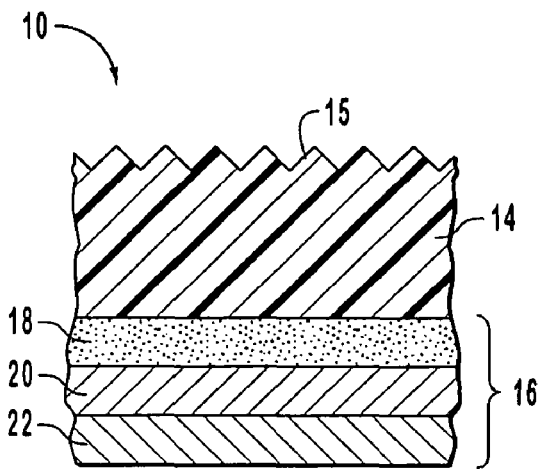
FIG. 1A is a schematic depiction of a security article having a color shifting optical coating according to one embodiment of the present invention.

Referring to the drawings, wherein like structures are provided with like reference designations, FIG. 1A depicts a security article 10 according to one embodiment of the present invention. The security article 10 includes a light transmissive substrate 14 formed with an optical interference pattern 15 on an outer first surface thereof. A color shifting optical coating 16 is formed on an opposing second surface of substrate 14 and is discussed in further detail below. The combination of substrate 14 and color shifting optical coating 16 forming security article 10 provide a security feature that reduces the possibility of duplication, forgery and/or counterfeiting of an object having security article 10 thereon.

The optical interference pattern 15 formed on the outer surface of light transmissive substrate 14 can take various conventional forms including diffraction patterns such as diffraction gratings, refraction patterns, holographic patterns such as two-dimensional and three-dimensional holographic images, corner cube reflectors, or other like interference patterns. The particular methods and structures that form optical interference pattern 15 are known by those skilled in the art. For example, embossing the light transmissive substrate to form an interference pattern thereon can be done by well known methods, such as embossing the surface of a plastic film by pressing it in contact with a heated nickel embossing shim at high pressure. Other methods include photolithography, molding of the plastic film against a patterned surface, and the like.

Generally, moldable materials are used to form light transmissive substrate 14 and include, for example, plastics such as polyethylene terephthalate (PET), especially PET type G, polycarbonate, acrylics such as polyacrylates including polymethyl methacrylate (PMMA), polyacrylonitrile, polyvinyl chloride, polystyrene, polypropylene, polynaphthalene terephthalate (PNT), mixtures or copolymers thereof, and the like. It is preferred that light transmissive substrate 14 be substantially composed of a transparent material such as polycarbonate. The substrate 14 is formed to have a suitable thickness of about 5 µm to about 100 µm, and preferably a thickness of about 12 µm to about 25 µm. In addition, substrate 14 can be made of one layer or multiple layers of substrate materials.

In one embodiment, substrate 14 can be produced from a thermoplastic film that has been embossed by heat softening the surface of the film and then passing the film through embossing rollers which impart the diffraction grating or holographic image onto the softened surface. In this way, sheets of effectively unlimited length can be formed with the diffraction grating or holographic image thereon.

As shown in FIG. 1A, the color shifting optical coating 16 is a multilayer optical interference film that includes an absorber layer 18, a dielectric layer 20, and a reflector layer 22. The absorber layer 18 is deposited on light transmissive substrate 14 by a conventional deposition process such as physical vapor deposition (PVD), sputtering, or the like. The absorber layer 18 is formed to have a suitable thickness of about 30-150 Angstroms, and preferably a thickness of about 50-100 Angstroms. The absorber layer 18 can be composed of a semi-opaque material such as a grey metal, including metals such as chromium, nickel, titanium, vanadium, cobalt, and palladium, as well as other metals such as iron, tungsten, molybdenum, niobium, aluminum, and the like. Various combinations and alloys of the above metals may also be utilized, such as Inconel (Ni—Cr—Fe). Other absorber materials may also be employed in absorber layer 18 including metal compounds such as metal fluorides, metal oxides, metal sulfides, metal nitrides, metal carbides, metal phosphides, metal selenides, metal silicides, and combinations thereof, as well as carbon, germanium, cermet, ferric oxide, metals mixed in a dielectric matrix, and the like.

The dielectric layer 20 is formed on absorber layer 18 by a conventional deposition process such as PVD, reactive DC sputtering, RF sputtering, or the like. The dielectric layer 20 is formed to have an effective optical thickness for imparting color shifting properties to security article 10. The optical thickness is a well known optical parameter defined as the product $\eta d$, where $\eta$ is the refractive index of the layer and d is the physical thickness of the layer. Typically, the optical thickness of a layer is expressed in terms of a quarter wave optical thickness (QWOT) that is equal to 4 $\eta d/\lambda$, where $\lambda$ is the wavelength at which a QWOT condition occurs. The optical thickness of dielectric layer 20 can range from about 2 QWOT at a design wavelength of about 400 nm to about 9 QWOT at a design wavelength of about 700 nm, and preferably 2-6 QWOT at 400-700 nm, depending upon the color shift desired. Suitable materials for dielectric layer 20 include those having a "high" index of refraction, defined herein as greater than about 1.65, as well as those have a "low" index of refraction, which is defined herein as about 1.65 or less.

Examples of suitable high refractive index materials for dielectric layer 20 include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II) diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof, and the like.

Suitable low refractive index materials for dielectric layer 20 include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The reflector layer 22 is formed on dielectric layer 20 by a conventional deposition process such as PVD, sputtering, or the like. The reflector layer 22 is formed to have a suitable thickness of about 300-1000 Angstroms, and preferably a thickness of about 500-1000 Angstroms. The reflector layer 22 is preferably composed of an opaque, highly reflective metal such as aluminum, silver, copper, gold, platinum, niobium, tin, combinations and alloys thereof and the like, depending on the color effects desired. It should be appreciated that semi-opaque metals such as grey metals become opaque at approximately 350-400 Angstroms. Thus, metals such as chromium, nickel, titanium, vanadium, cobalt, and palladium, or cobalt-nickel alloys (which would be magnetic), could also be used at an appropriate thickness for reflector layer 22.

In addition, reflector layer 22 can be composed of a magnetic material such as a cobalt-nickel alloy, or can be formed of a semitransparent material, to provide for machine readability for security verification. For example, machine readable information may be placed on a backing underlying the optical coating, such as personal identification numbers (PINS), account information, business identification of source, warranty information, or the like. In an alternative embodiment, reflector layer 22 can be segmented to allow for partial viewing of underlying information either visually or through the use of various optical, electronic, magnetic, or other detector devices. This allows for detection of information below optical coating 16, except in those locations where reflector segments are located, thereby enhancing the difficulty in producing counterfeits. Additionally, since the reflector layer is segmented in a controlled manner, the specific information prevented from being read is controlled, providing enhanced protection from forgery or alteration.

By using an absorber/dielectric/reflector design for color shifting optical coating 16, such as shown in FIG. 1A, high chroma variable color effects are achieved that are noticeable to the human eye. Thus, an object having security article 10 applied thereto will change color depending upon variations in the viewing angle or the angle of the object relative to the viewing eye. As a result, the variation in colors with viewing angle increases the difficulty to forge or counterfeit security article 10. By way of example, the color-shifts that can be achieved utilizing color shifting optical coating 16 in accordance with the present invention include, but are not limited to, gold-to-green, green-to-magenta, blue-to-red, green-to-silver, magenta-to-silver, magenta-to-gold, etc.

The color shifting properties of optical coating 16 can be controlled through proper design of the layers thereof. Desired effects can be achieved through the variation of parameters such as thickness of the layers and the index of refraction of each layer. The changes in perceived color which occur for different viewing angles or angles of incident light are a result of a combination of selective absorption of the materials comprising the layers and wavelength dependent interference effects. The interference effects, which arise from the superposition of the light waves that have undergone multiple reflections and transmissions within the multilayered structure, are responsible for the shifts in perceived color with different angles.

Figure 1B:
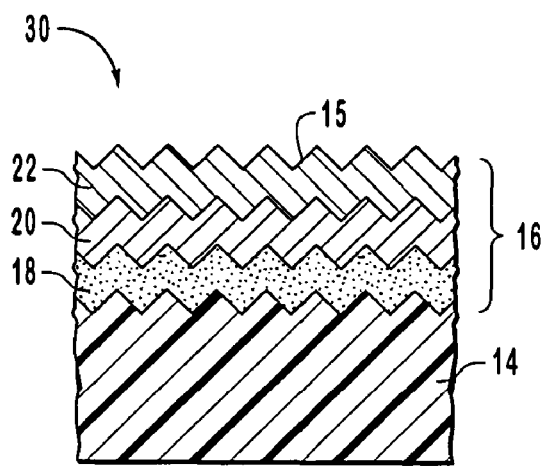
FIG. 1B is a schematic depiction of a security article having a color shifting optical coating according to an alternative embodiment of the present invention.

FIG. 1B depicts a security article 30 according to an alternative embodiment of the present invention. The security article 30 includes elements similar to those discussed above with respect to security article 10, including a light transmissive substrate 14 formed with an optical interference pattern on a surface thereof, and a color shifting optical coating 16 that is a multilayer film. The optical coating 16 is formed, however, on the same side as the interference pattern on substrate 14 by conventional deposition processes. The optical coating 16 includes an absorber layer 18 on the interference pattern, a dielectric layer 20 on absorber layer 18, and a reflector layer 22 on dielectric layer 20. As shown in FIG. 1B, each of these layers formed on substrate 14 conforms to the shape of the interference pattern such as a holographic image.

Figure 2A:
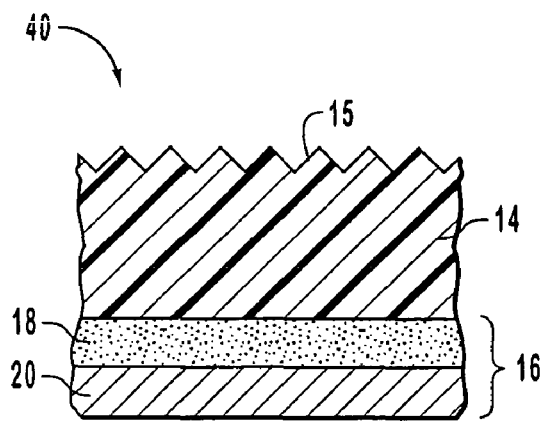
FIG. 2A is a schematic depiction of a security article having a color shifting optical coating according to another embodiment of the present invention.

FIG. 2A depicts a security article 40 according to another embodiment of the present invention. The security article 40 includes elements similar to those discussed above with respect to security article 10, including a light transmissive substrate 14 formed with an optical interference pattern 15 on an outer first surface thereof, and a color shifting optical coating 16 formed on an opposing second surface of substrate 14. The optical coating 16 is a multilayer film that includes an absorber layer 18 and a dielectric layer 20 thereon, but does not include the reflector layer. This allows optical coating 16 to be transparent to light incident upon the surface thereof, thereby providing for visual verification or machine readability of information below optical coating 16 on a carrier substrate (not shown).

Figure 2B:
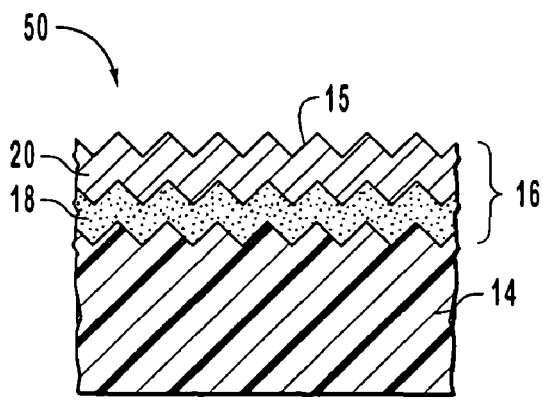
FIG. 2B is a schematic depiction of a security article having a color shifting optical coating according to an alternative embodiment of the present invention.

FIG. 2B depicts a security article 50 according to an alternative embodiment of the present invention. The security article 50 includes elements similar to those discussed above with respect to security article 40, including a light transmissive substrate 14 formed with an optical interference pattern on a surface thereof, and a color shifting optical coating 16 that is a multilayer film. The optical coating 16 is formed, however, on the same side as the interference pattern on substrate 14 by conventional deposition processes. The optical coating 16 includes an absorber layer 18 on the interference pattern, and a dielectric layer 20 on absorber layer 18. This allows optical coating 16 to be transparent to light incident upon the surface thereof, providing for visual verification or machine readability of information on a carrier substrate.

Figure 3:
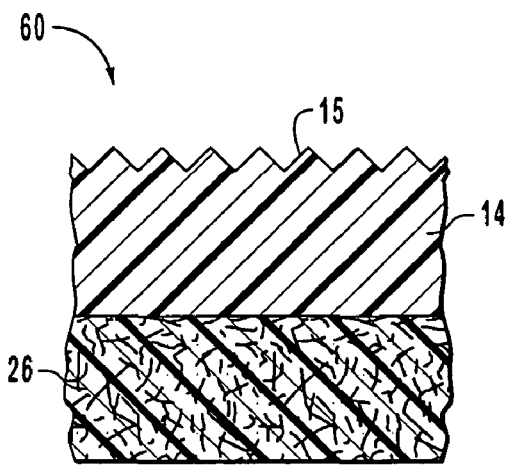
FIG. 3 is a schematic depiction of a security article according to yet another embodiment of the present invention.

FIG. 3 depicts a security article 60 according to a further embodiment of the present invention. The security article 60 includes elements similar to those discussed above with respect to security article 10, including a light transmissive substrate 14 formed with an optical interference pattern 15 on an outer first surface thereof, and a color shifting optical coating 26 applied to an opposing second surface of substrate 14. The color shifting optical coating 26 is formed from a layer of color shifting ink or paint that includes a polymeric medium interspersed with a plurality of optical interference flakes having color shifting properties.

The color shifting flakes of optical coating 26 are formed from a multilayer thin film structure that includes the same basic layers as described above for the optical coating 16 of security article 10. These include an absorber layer, a dielectric layer, and optionally a reflector layer, all of which can be composed of the same materials discussed above in relation to the layers of optical coating 16. The flakes can be formed to have a symmetrical multilayer thin film structure, such as absorber/dielectric/reflector/dielectric/absorber, or absorber/dielectric/absorber. Alternatively, the flakes can have a non-symmetrical structure, such as absorber/dielectric/reflector. The flakes are formed so that a dimension on any surface thereof ranges from about 2 to about 200 microns.

Typically, the multilayer thin film structure is formed on a flexible web material with a release layer thereon. The various layers are deposited on the web by methods well known in the art of forming thin coating structures, such as PVD, sputtering, or the like. The multilayer thin film structure is then removed from the web material as thin film flakes, which can be added to a polymeric medium such as various pigment vehicles for use as an ink or paint. In addition to the flakes, additives can be added to the inks or paints to obtain desired color shifting results. These additives include lamellar pigments such as aluminum flakes, graphite, mica flakes, and the like, as well as non-lamellar pigments such as aluminum powder, carbon black, and other colorants such as organic and inorganic pigments, and colored dyes.

Suitable embodiments of the flake structure are disclosed in a copending application Ser. No. 09/198,733, filed on Nov. 24, 1998, now U.S. Pat. No. 6,157,489 and entitled "Color Shifting Thin Film Pigments," which is incorporated herein by reference. Other suitable embodiments of color shifting or optically variable flakes which can be used in paints or inks for application in the present invention are described in U.S. Pat. Nos. 5,135,812, 5,171,363, 5,278,590, 5,084,351, and 4,838,648, the disclosures of which are incorporated herein by reference.

For example, U.S. Pat. No. 5,135,812 discloses a symmetrical optical multilayer film which is composed either of transparent all-dielectric stacks, or transparent dielectric and semi-transparent metallic layered stacks. In the case of an all-dielectric stack, the optical coating is made of alternating layers of high and low index of refraction materials. In U.S. Pat. No. 5,278,590 to Phillips et al., a symmetrical three-layer optical interference coating which can be formed into flakes is disclosed and includes first and second partially transmitting absorber layers that have essentially the same composition and thickness, with a dielectric spacer layer located between the first and second absorber layers. The dielectric layer is composed of a material having a low index of refraction such as magnesium fluoride.

The color shifting ink or paint utilized to form optical coating 26 on security device 60 can be applied by conventional coating devices and methods known to those skilled in the art. These include, for example, various printing methods such as silk screen, intaglio, gravure or flexographic methods, and the like. Alternatively, optical coating 26 can be formed on security device 60 by coextruding a polymeric material containing color shifting flakes, with the plastic material used to form substrate 14 having interference pattern 15.

Figure 4:
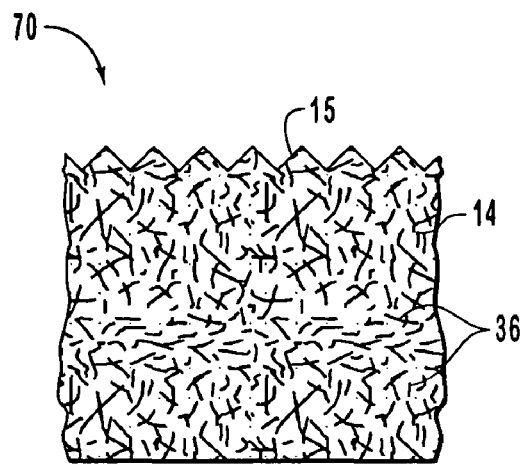
FIG. 4 is a schematic depiction of a security article according to a further embodiment of the present invention.

FIG. 4 depicts a security article 70 according to another embodiment of the present invention. The security article 70 includes a light transmissive substrate 14 formed with an optical interference pattern 15 on an outer surface thereof. A color shifting pigment is dispersed within substrate 14 and comprises a plurality of multilayer optical interference flakes, such as those described above with respect to security article 40. The flakes are dispersed within the material that forms substrate 14 prior to formation thereof. Preferably, the flakes are oriented so that they lie parallel to the planar back surface of substrate 14 opposite from the outer surface thereof in order to provide maximum color shifting effects.

The various security articles as described above can be used in a variety of applications to provide for enhanced security measures such as anticounterfeiting. The security articles can be utilized in the form of a label, tag, ribbon, security thread, tape, and the like, for application in a variety of objects such as security documents, monetary currency, credit cards, merchandise packaging, license cards, negotiable notes, bank bonds, paper, plastic, or glass products, or other similar objects.

Figure 5:
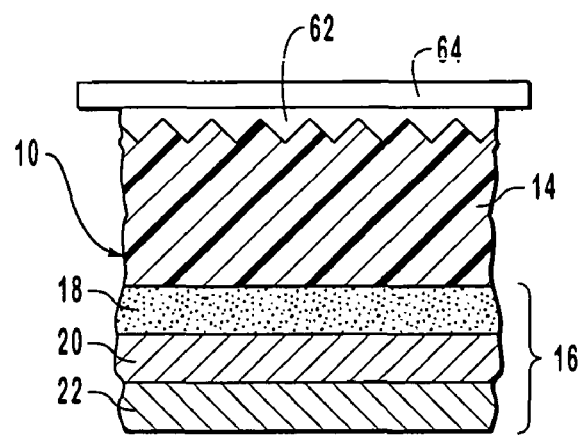
FIG. 5 is a schematic depiction of the security article of FIG. 1A with a release layer formed thereon.

The security articles of the invention can be transferred and attached to various objects by a variety of conventional processes. For example, the security articles can applied to an object by use of a release layer. FIG. 5 shows security article 10 with a release layer 62 formed on substrate 14. The release layer 62 is of a suitable type to allow security article 10 to be removed therefrom during the application process, such as by a hot-stamping process. The release layer 62 may be a polymeric material such as polyvinyl chloride, polystyrene, chlorinated rubber, acrylonitrile-butadiene-styrene copolymer, nitrocellulose, methyl methacrylate, acrylic copolymers, fatty acids, waxes, gums, gels, and mixtures thereof. The release layer is coupled to a carrier structure 64, which can be part of various manufacturing belts or other processing structures that assist in transferring security article 10 to the final structural element.

Figure 6:
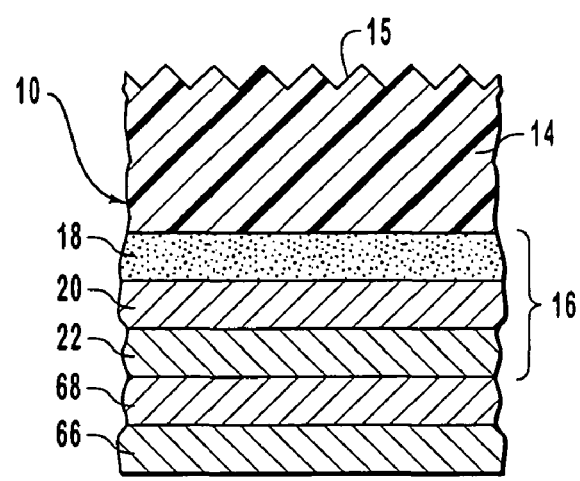
FIG. 6 is a schematic depiction of the security article of FIG. 1A attached to a carrier substrate.

As shown in FIG. 6, the release layer is removed when security article 10 has been applied to an object such as by hot-stamping, and the security article is coupled to a carrier substrate 66 by way of an adhesive layer 68. The carrier substrate 66 may take the form of the final structural object to which security article 10 is to be bonded, such as those objects discussed above. The materials forming carrier substrate 66 can be selected from plastics, cellulose, composites, polyester films, PET sheets, mylar sheets, cellophane, polypropylene, paper, rag/cotton, combinations thereof, and the like. The material of adhesive layer 68 can be selected from acrylic-based polymers, UV activated adhesives, ethylene vinyl acetate, polyamides, and the like.

Figure 7:
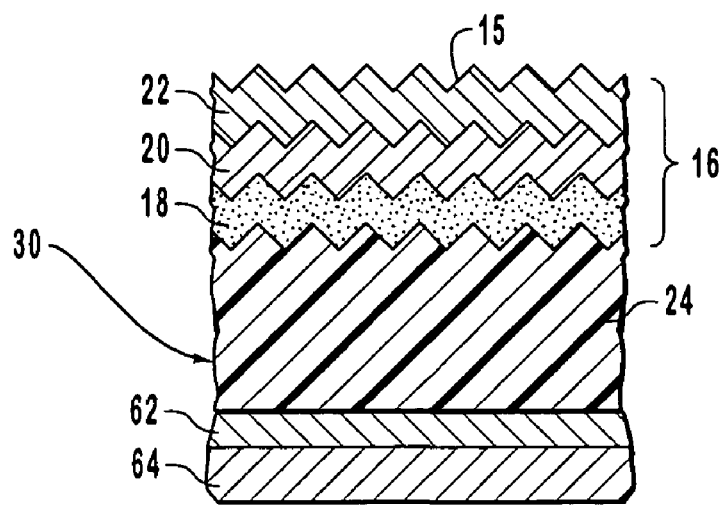
FIG. 7 is a schematic depiction of the security article of FIG. 1B with a release layer formed thereon.
Figure 8:
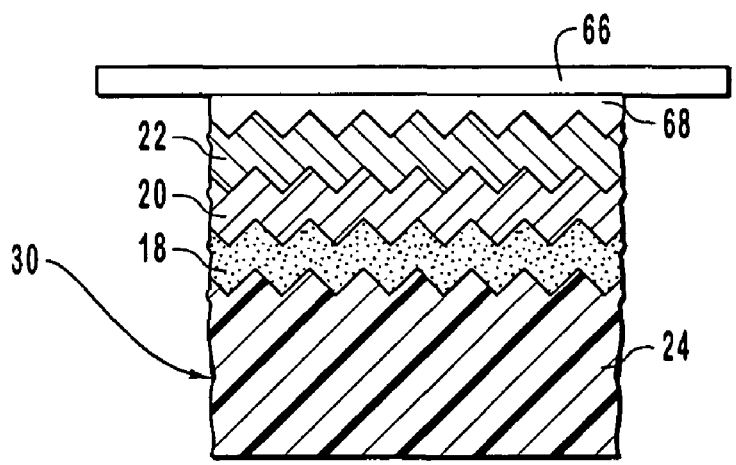
FIG. 8 is a schematic depiction of the security article of FIG. 1B attached to a carrier substrate.

FIGS. 7-8 depict the method and final structure of affixing a security article, such as security article 30, to a carrier substrate 66 through a hot-stamping process. FIG. 7 shows security article 30 with a release layer 62 formed on one side of a light transmissive substrate 24, such as an acrylic coating with an interference pattern formed thereon. The substrate 24 may be composed of other materials such as those discussed above relative to substrate 14, including polystyrene, polyacrylonitrile, polyvinyl chloride, and the like. The release layer 62 is formed on the side opposite from optical coating 16 on the interference pattern, and is attached to a carrier structure 64. The release layer 62 allows security article 30, including substrate 24, absorber layer 18, dielectric layer 20, and reflector layer 22, to be released from carrier structure 64 during the hot-stamping process.

Generally, carrier structure 64 can be composed of various materials with various thicknesses which are known by those skilled in the art. For example, when carrier structure 64 is formed of PET, the thickness preferably ranges from about 10 μm to about 75 □m. Other materials and thickness ranges are applicable in light of the teachings contained herein.

Furthermore, the thickness of light transmissive substrate 24, when taking the form of an acrylic material, can range from about 3 μm to about 20 μm with an embossed surface. Generally, substrate 24 should have a lower melting point or glass transition temperature than the optical coating, while being transparent.

Prior to hot-stamping, an adhesive layer 68 is formed on reflector layer 22, with the adhesive layer having a thickness of about 2 μm to about 20 μm. As shown in FIG. 8, the release layer and carrier structure are removed when security article 30 has been applied to an object such as a carrier substrate 66 by hot-stamping, with security article 30 being coupled to carrier substrate 66 by way of adhesive layer 68. The bonding of adhesive layer 68 against carrier substrate 66 occurs as a heated metal stamp (not shown) comes into contact with carrier structure 64. The heated metal stamp simultaneously forces adhesive layer 68 against carrier substrate 66 while heating adhesive layer 68 to more effectively bond to carrier substrate 66. Furthermore, the heated metal stamp softens release layer 62 thereby aiding in releasing security article 30 from carrier structure 64 which is subsequently discarded. Once security article 30 has been attached to carrier substrate 66, the image produced by security article 30 is viewed from substrate 24 toward optical coating 16.

The following examples are given to illustrate the present invention, and are not intended to limit the scope of the invention.

EXAMPLE 1

Optical coatings composed of color shifting flakes in a polymeric vehicle were formed by a drawdown process on light transmissive substrates composed of PET films containing a holographic image. The drawdown vehicle included two parts lacquer/catalyst and one part color shifting flakes. The color shifting flakes utilized had color shifting properties of green-to-magenta, blue-to-red, and magenta-to-gold.

EXAMPLE 2

A color shifting optical coating having a three-layer design was formed on an embossed transparent film to produce a security article. The optical coating was formed on the flat surface of the transparent film on the side opposite from the embossed surface. The optical coating was formed by depositing an absorber layer composed of chromium on the flat surface of the transparent film, depositing a dielectric layer composed of magnesium fluoride on the absorber layer, and depositing a reflector layer of aluminum on the dielectric layer.

Alternatively, the aluminum layer can be deposited so that it is transparent. This would allow printed information on an object to be read underneath the optical coating. Further, the reflector layer can alternatively be composed of a magnetic material. Such a magnetic feature in the color shifting component when added to the holographic component would give three independent security features to the security article.

The embossed film and optical coating forming the security article can be rigidly affixed to a carrier substrate, or can be attached to a release layer so that the security article can be hot stamped to a surface of an object. In addition, the hot stamped image of the color shifting thin film can be in the form of a pattern, as for example, dots, lines, logos, or other images. This pattern of optically variable effects will add an even greater degree of deterrence to counterfeiting.

The present invention may be embodied in other specific forms without departing from its spirit or essential characteristics. The described embodiments are to be considered in all respects only as illustrative and not restrictive. The scope of the invention is, therefore, indicated by the appended claims rather than by the forgoing description. All changes which come within the meaning and range of equivalency of the claims are to be embraced within their scope.

What is claimed and desired to be secured by United States Letters Patent is:

1. A method of forming a security article, comprising the steps of:

providing a light transmissive substrate having a first surface and an opposing second surface, the first surface having an optical interference pattern; and forming a color shifting optical coating on the second surface of the substrate, the second surface being substantially planar, wherein the color shifting coating provides an observable discrete color shift such that the article has a first background color at a first angle of incident light or viewing and a second background color different from the first background color at a second angle of incident light or viewing, the article exhibiting an optical diffraction grating pattern effect or a holographic image pattern effect in addition to the first and second background colors, and wherein a thickness of the substrate is in a range of 3 μm to 100 μm.

2. The method of claim 1, wherein the color shifting optical coating is formed by depositing an absorber layer on the second surface of the substrate, depositing a dielectric layer overlying the absorber layer and depositing a reflector layer overlying the dielectric layer.

3. The method of claim 1, wherein the color shifting optical coating is formed by depositing a first absorber layer on the second surface of the substrate, depositing a dielectric layer overlying the absorber layer and depositing a second absorber layer overlying the dielectric layer.

4. The method of claim 1, wherein the color shifting optical coating is formed by applying a color shifting ink comprising a plurality of multilayer color shifting flakes dispersed in a polymeric medium to the second surface of the substrate.

5. The method of claim 1, wherein the color shifting optical coating is formed on the second surface of the substrate by coextruding a color shifting material comprising a plurality of multilayer optical interference flakes dispersed in a polymeric medium, with a material forming the substrate.

6. The method of claim 1, further comprising the steps of forming a release layer on the substrate, and of hot stamping the security article to an object.

* * * * *